United States Patent
Reddem et al.

(10) Patent No.: US 11,652,613 B2
(45) Date of Patent: May 16, 2023

(54) SECURE INFORMATION EXCHANGE IN FEDERATED AUTHENTICATION

(71) Applicant: Citrix Systems, Inc., Fort Lauderdale, FL (US)

(72) Inventors: Dileep Reddem, Hyderabad (IN); Ricardo Fernando Feijoo, Davie, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 189 days.

(21) Appl. No.: 17/012,207

(22) Filed: Sep. 4, 2020

(65) Prior Publication Data

US 2022/0078007 A1    Mar. 10, 2022

(51) Int. Cl.
*H04L 9/08* (2006.01)
*H04L 9/32* (2006.01)

(52) U.S. Cl.
CPC ............ *H04L 9/0825* (2013.01); *H04L 9/085* (2013.01); *H04L 9/0866* (2013.01); *H04L 9/3213* (2013.01); *H04L 9/3226* (2013.01)

(58) Field of Classification Search
CPC ..... H04L 9/0825; H04L 9/085; H04L 9/0866; H04L 9/3213; H04L 9/3226
See application file for complete search history.

(56) References Cited

U.S. PATENT DOCUMENTS

| | | | |
|---|---|---|---|
| 2007/0044143 A1* | 2/2007 | Zhu ..................... | H04L 9/3236 726/8 |
| 2011/0067095 A1* | 3/2011 | Leicher ................. | H04L 63/12 726/10 |
| 2013/0014239 A1* | 1/2013 | Pieczul ................. | G06F 21/41 726/7 |
| 2015/0074407 A1* | 3/2015 | Palmeri ................. | H04L 51/32 713/171 |
| 2017/0289185 A1* | 10/2017 | Mandyam ........... | H04L 63/0236 |
| 2018/0139049 A1* | 5/2018 | Goranov .............. | H04L 9/3247 |
| 2019/0114631 A1* | 4/2019 | Madhu ................. | H04L 9/3228 |
| 2019/0394032 A1* | 12/2019 | Vudathu ............... | H04L 9/3239 |
| 2020/0099675 A1* | 3/2020 | Mardiks Rappaport ..................... H04L 63/0807 |
| 2020/0259652 A1* | 8/2020 | Schmaltz, III ........... | H04L 9/30 |
| 2022/0052849 A1* | 2/2022 | Kasso ................... | H04L 9/3213 |

OTHER PUBLICATIONS

Sep. 13, 2021—AU Examination Report No. 1 for Standard Patent Application No. 2020233653.

* cited by examiner

*Primary Examiner* — J. Brant Murphy

(57) ABSTRACT

Methods, apparatuses, systems, and computer-readable mediums for sharing user credentials in federated authentication are described herein. An identity provider may receive a user credential from a user device. The identity provider may receive, from a relying party, a request for an access token. The identity provider may encrypt the user credential based on a nonce that is uniquely generated for the relying party. The identity provider may send a response to the relying party. The response may include the access token, the encrypted user credential, and the nonce.

14 Claims, 9 Drawing Sheets

SECURE INFORMATION EXCHANGE IN FEDERATED AUTHENTICATION

FIELD

Aspects described herein generally relate to network security and federated identity management. More specifically, one or more aspects described herein provide for secure information exchange between an identity provider and a relying party during a federated authentication over a computer network.

BACKGROUND

Many internet services require user authentication. It may be advantageous for user devices and servers to keep as few authentication credentials as possible. Federated authentication may be used to allow a client (e.g., relying party) to securely verify a user's identity based on an authentication executed by an identity provider or authorization server. In this way, a user may access many Internet services or client reliant parties using only the credentials required for authentication by a single identity provider or authorization server.

In federated authentication, the relying party does not obtain access to a user's credentials. However, circumstances may exist such that a user may desire for a trusted relying party to securely obtain and subsequently use the user's credentials, but this is presently not possible in a secure manner.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards securely exchanging information, such as user credentials, between a relying party and an identity provider in federated authentication.

An identity provider may receive a user credential from a user device. The identity provider may receive, from a relying party, a request for an access token. The identity provider may encrypt the user credential based on a nonce that is uniquely generated for the relying party. The identity provider may send a response to the request to the relying party. The response may include the access token, the encrypted user credential, and the nonce.

Encrypting the user credential may be further based on a successful authentication, by the identity provider and using the user credential, of a user associated with the user device.

The request may include a client secret associated with the relying party. Encrypting the user credential may include generating a key based on the client secret and the nonce and encrypting the user credential based on the key. The client secret may be associated with the relying party.

Generating the key may include performing a password-based key derivation function, for a predetermined quantity of iterations, on the client secret and the nonce.

The identity provider may further generate the client secret that is unique to the relying party, and send the client secret to the relying party.

The request may include a token request that is in accordance with an OpenID connect authorization code flow.

The response may include a JavaScript Object Notation Web Token (JWT) message and/or a JavaScript Object Notation Web Encryption (JWE) message.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards securely exchanging information in federated authentication. For example, an identity provider in accordance with the OpenID Connect protocol may encrypt and embed sensitive data such as user credentials (e.g., username, password, etc.) in an access token and send the access token to a relying party. Subsequently, the relying party may decrypt the message to extract the user credentials and use them at a later time. Moreover, the identity provider may use a nonce and a client secret when encrypting the user credentials in order to make the exchange of information more secure and less prone to malicious attacks (e.g., replay attacks, dictionary attacks, etc.). The various embodiments in the present embodiment allow the relying party to have access to information that would otherwise not have been available to it under the conventional OpenID protocol.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
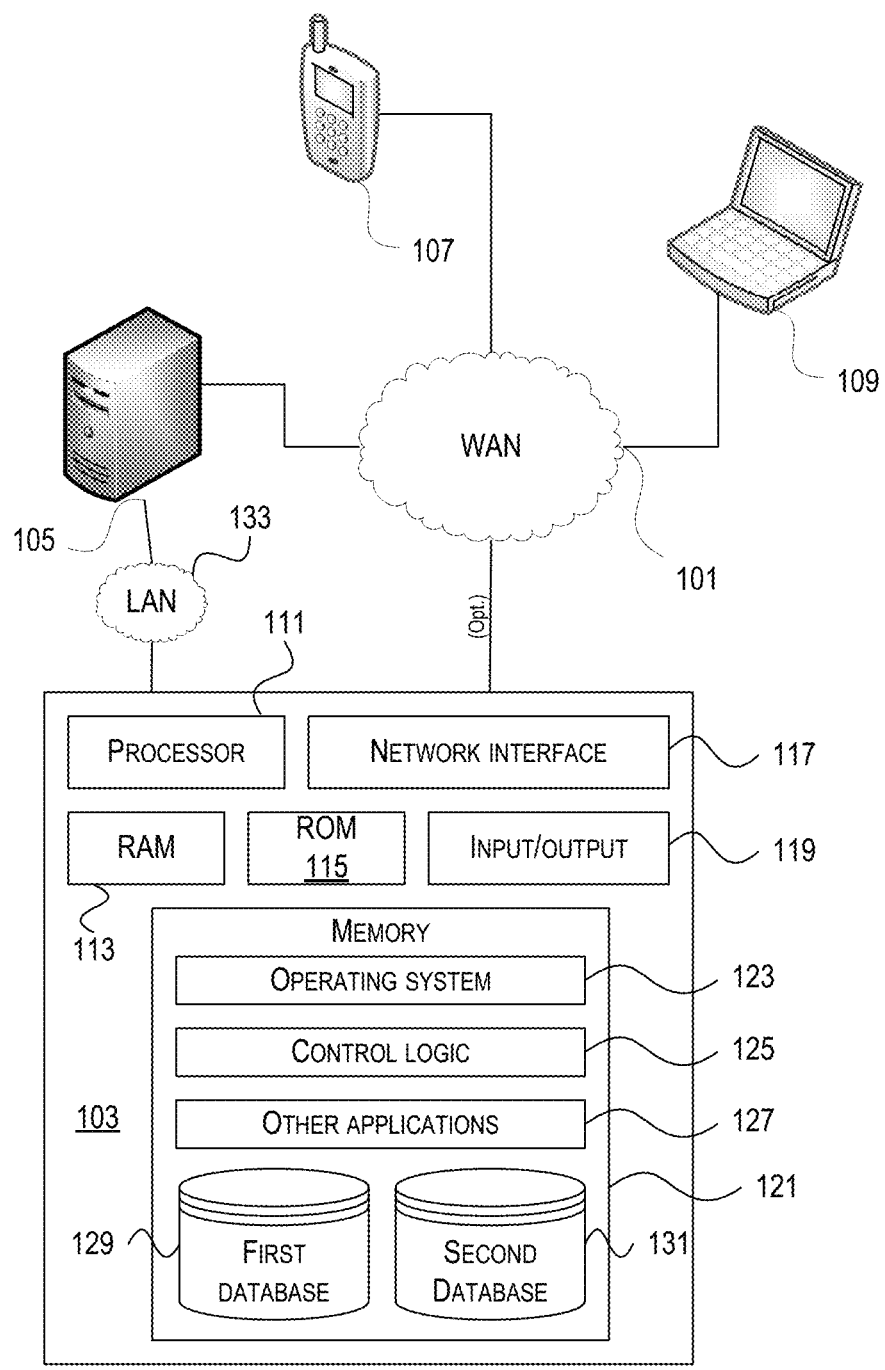
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
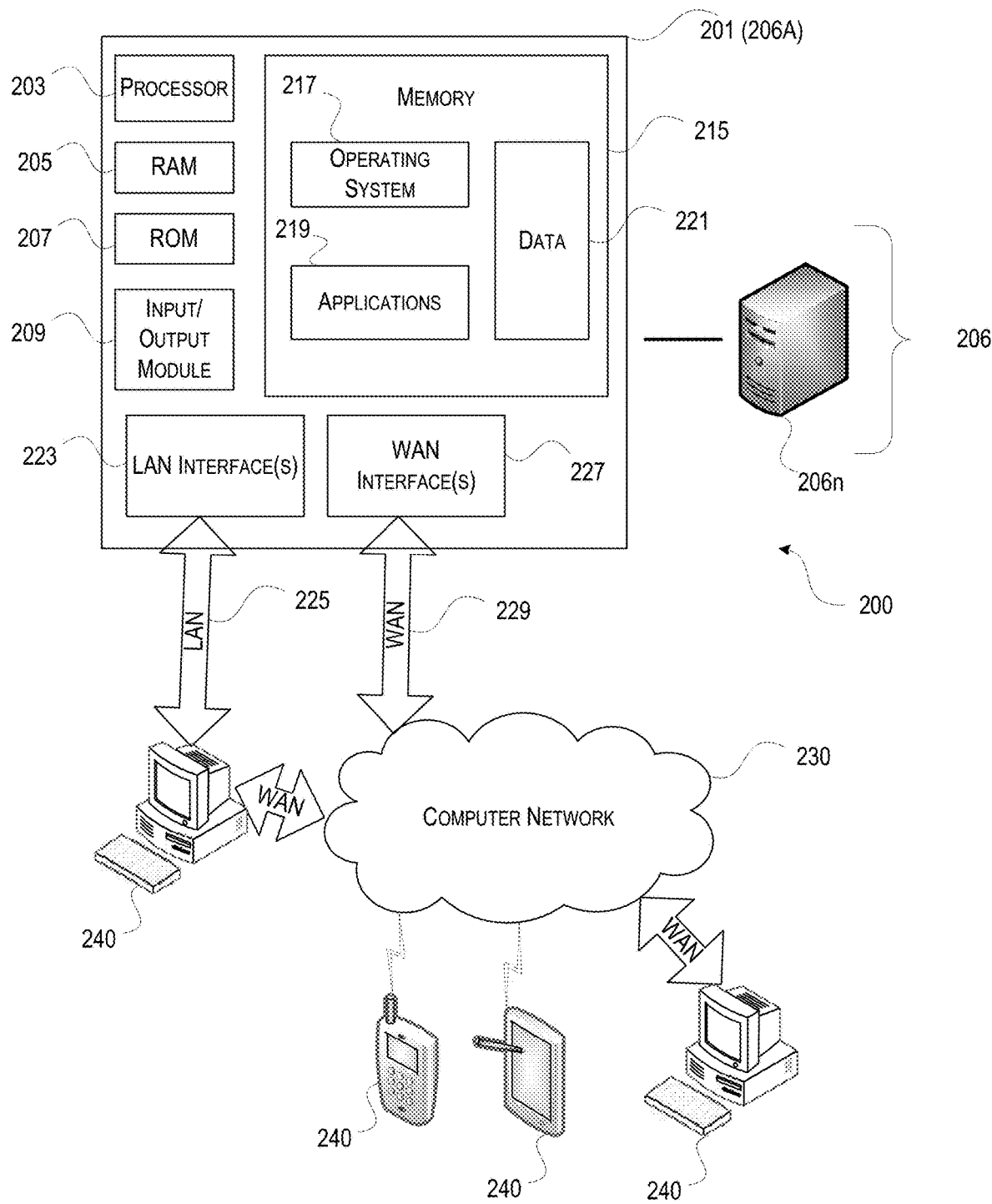
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
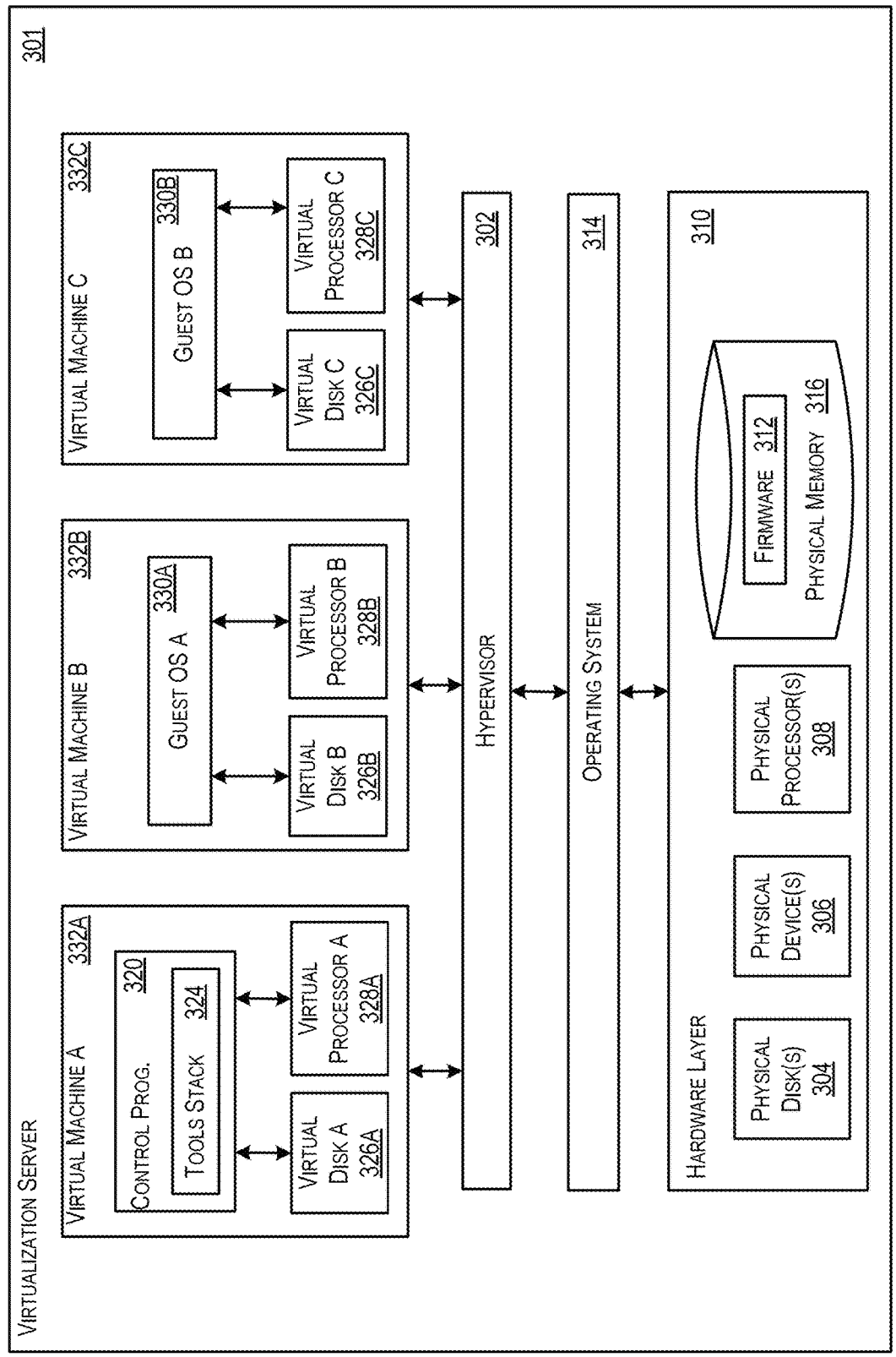
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
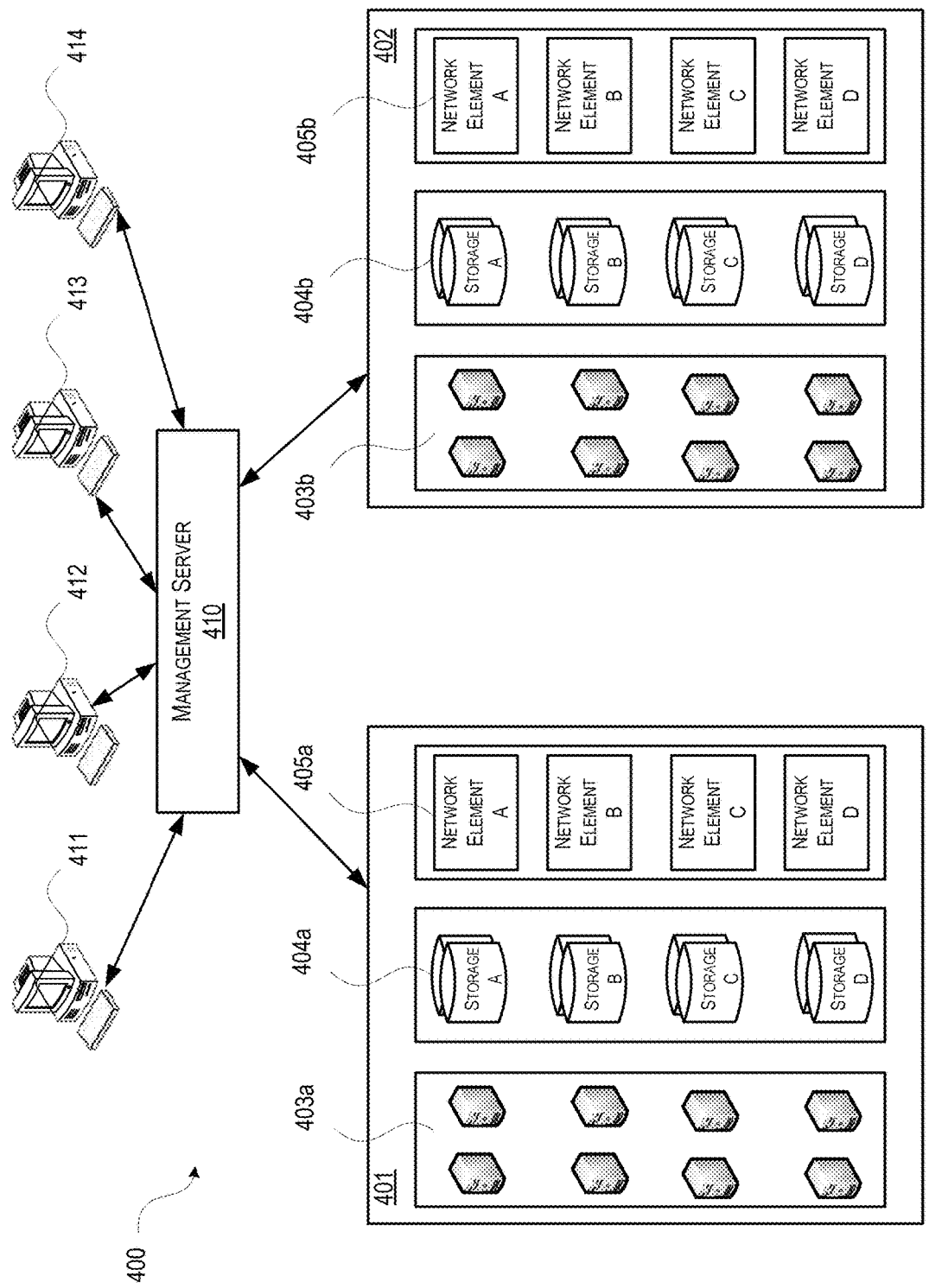
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Device Management Architecture

Figure 5:
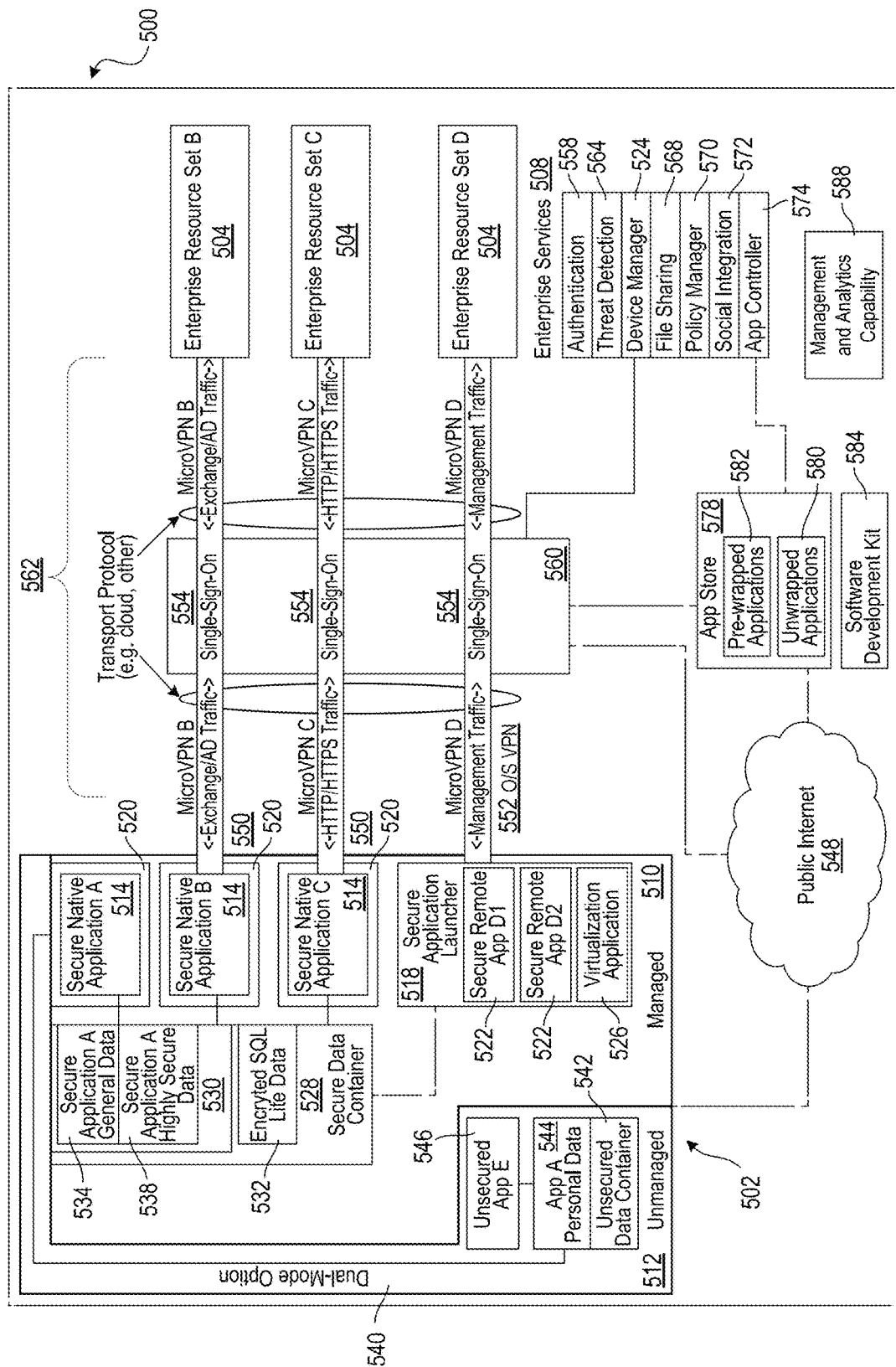
FIG. 5 depicts an illustrative enterprise device management system.

FIG. 5 represents an enterprise device technical architecture 500 for use in a "Bring Your Own Device" (BYOD) environment. The architecture enables a user of a device 502 (e.g., a mobile device, a personal computer, etc.) to both access enterprise or personal resources from a device 502 and use the device 502 for personal use. The user may access such enterprise resources 504 or enterprise services 508 using a device 502 that is purchased by the user or a device 502 that is provided by the enterprise to the user. The user may utilize the device 502 for business use only or for business and personal use. The device 502 may run an iOS operating system, an Android operating system, or the like. The enterprise may choose to implement policies to manage the device 502. The policies may be implemented through a firewall or gateway in such a way that the device 502 may be identified, secured or security verified, and provided selective or full access to the enterprise resources (e.g., 504 and 508.) The policies may be device management policies (e.g., mobile device management policies), application management policies (e.g., mobile application management policies), data management policies (e.g., mobile data management policies), or some combination of device, application, and data management policies. A device 502 that is managed through the application of device management policies may be referred to as an enrolled device.

In some embodiments, the operating system of the device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the device management system (e.g., mobile device management system) when that application is executing on the device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the device 502 when the secure native application 514 is executed on the device 502. The secure application wrapper 520 may include meta-data that points the secure native application 514 running on the device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the device 502, at the enterprise resources 504, and the like. The resources used on the device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the device 502, this arrangement may also be elected for certain applications. For example, while some applications may be secured for use on the device 502, others might not be prepared or appropriate for deployment on the device 502 so the enterprise may elect to provide the user access (e.g., mobile user access) to the unprepared applications through virtualization techniques. As another example, the enterprise may have large complex applications with large and complex data sets (e.g., material resource planning applications) where it would be very difficult, or otherwise undesirable, to customize the application for the device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured environment (e.g., secured mobile environment) so the enterprise may elect to use virtualization techniques to permit access (e.g., mobile access) to such applications and data. An enterprise may elect to provide both fully secured and fully functional applications on the device 502 as well as a virtualization application 526 to allow access to applications that are deemed more properly operated on the server side. In an embodiment, the virtualization application 526 may store some data, files, etc. on the device 502 in one of the secure storage locations. An enterprise, for example, may elect to allow certain information to be stored on the device 502 while not permitting other information.

In connection with the virtualization application 526, as described herein, the device 502 may have a virtualization application 526 that is designed to present GUIs and then record user interactions with the GUI. The virtualization application 526 may communicate the user interactions to the server side to be used by the server-side application as user interactions with the application. In response, the application on the server side may transmit back to the device 502 a new GUI. For example, the new GUI may be a static page, a dynamic page, an animation, or the like, thereby providing access to remotely located resources.

The secure applications 514 may access data stored in a secure data container 528 in the managed partition 510 of the device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the device 502. The data stored in an unsecured data container may be personal data 544. The data stored in an unsecured data container 542 may also be accessed by unsecured applications 546 that are running on the unmanaged partition 512 of the device 502. The data stored in an unsecured data container 542 may remain on the device 502 when the data stored in the secure data container 528 is deleted from the device 502. An enterprise may want to delete from the device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The device 502 may connect to enterprise resources 504 and enterprise services 508 at an enterprise, to the public Internet 548, and the like. The device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the device (as illustrated by O/S VPN 552), and the like. For example, each of the wrapped applications in the secured area of the device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the device 502. The access gateway 560 may also re-route traffic from the device 502 to the public Internet 548, enabling the device 502 to access publicly available and unsecured applications that run on the public Internet 548. The device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the device 502 directly or through the access gateway 560. The enterprise resources 504 may be accessed by the device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the device 502, by the enterprise resources 504, and the like. The certificates stored on the device 502 may be stored in an encrypted location on the device 502, the certificate may be temporarily stored on the device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise device technical architecture 500 may include an application store 578. The application store 578 may include unwrapped applications 580, pre-wrapped applications 582, and the like. Applications may be populated in the application store 578 from the application controller 574. The application store 578 may be accessed by the device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the device 502 by populating it in the application store 578 using the application controller 574.

The enterprise device technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
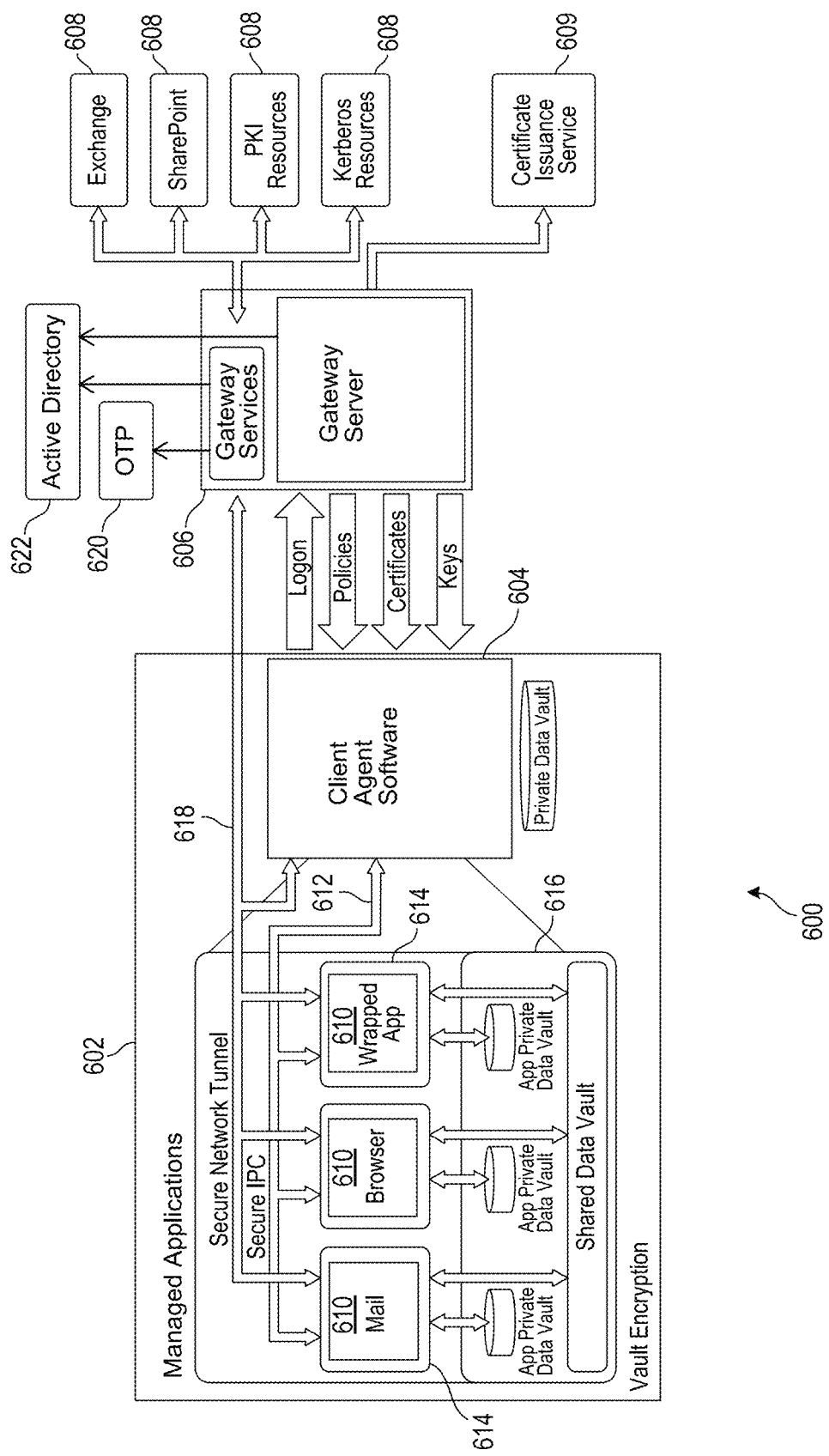
FIG. 6 depicts another illustrative enterprise device management system.

FIG. 6 is another illustrative enterprise device management system 600 (e.g., enterprise mobile management system). Some of the components of the device management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left-hand side represents an enrolled device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right-hand side above. Although not specifically shown, the device 602 (e.g., a mobile device, a personal computer, etc.) may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the device 602, such as native iOS or Android applications. For example, the managed applications 610 (mail, browser, wrapped application) shown in the figure above are all native applications that execute locally on the device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one-time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client-side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain.

Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Sharing User Credentials in Federated Identity Management

Figure 7:
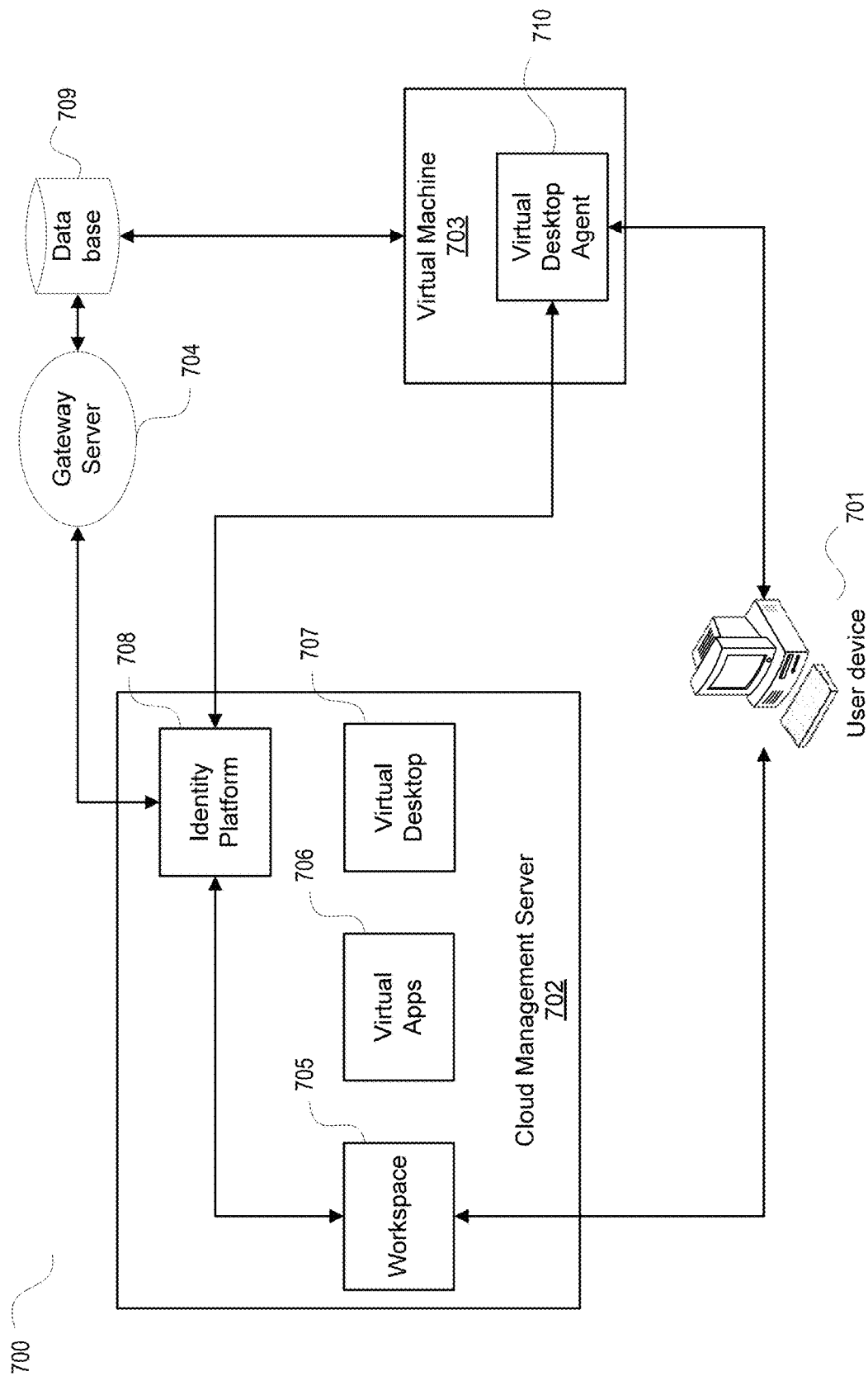
FIG. 7 depicts an illustrative cloud computing environment using federated identity management.

FIG. 7 depicts an illustrative cloud computing environment using federated identity management. In cloud computing environment 700, user device 701 may connect to cloud management server 702 to access various cloud services such as a remote desktop service through virtual machine 703. Cloud management server 702 may interact with gateway server 704 to access various resources and services, and also for authenticating user device 701.

User device 701 may include one or more of, for example, devices 103, 106, 107, and 109 of FIG. 1; terminals 240 of FIG. 2; client computers 411-414 of FIG. 2; device 502 of FIG. 5; device 602 of FIG. 6; etc. A user may use user device 701 to access various cloud services provided by cloud management server 702. User device 701 may also access a remote desktop service via cloud management server 702 and/or virtual machine 703.

Cloud management server 702 may be cloud-based platform comprising various online (i.e., cloud) services. Cloud management server 702 may include a computing device (e.g., a server) that manages one or more online resources that are available to a remote device (e.g., client device 701) via a network (e.g., the Internet). Cloud management server 702 may include, for example, network node 103 of FIG. 1, server 206a of FIG. 2, management server 410 of FIG. 4, etc. Cloud management server 702 may be implemented on one or more physical servers. Cloud management server 702 may run, for example, Citrix Cloud by Citrix Systems, Inc. of Ft. Lauderdale, Fla., or OPENSTACK, among others. Cloud management server 702 may manage various computing resources, including cloud hardware and software resources, for example, gateway server 704, virtual machine 703, etc. The cloud hardware and software resources may include private and/or public components.

Cloud management server 702 may be configured to provide user interfaces through which cloud operators and cloud customers may interact with cloud computing environment 700. For example, cloud management server 702 may provide a set of application programming interfaces (APIs) and/or one or more cloud operator console applications (e.g., web-based or standalone applications), such as workspace 705, with user interfaces to allow cloud operators to manage the cloud resources, configure the virtualization layer, manage customer accounts, facilitate authentication of user device 701, and perform other cloud administration tasks. Workspace 705 (e.g., Citrix Workspace by Citrix Systems, Inc. of Ft. Lauderdale, Fla.) may be a portal which user device 701 can connect to and launch other applications from. Cloud management server 702 also may include a set of APIs and/or one or more customer console applications with user interfaces configured to receive cloud computing requests from end users via user device 701 and other client devices, for example, requests to create, modify, or destroy virtual machines within the cloud. For example, cloud management server 702 may include virtual apps 706, virtual desktop 707, identity platform 708, etc. User device 701 may connect to cloud management server 702 via the Internet or some other communication network, and may request access to one or more of the computing resources managed by cloud management server 702. Cloud management server 702 may serve multiple client devices including user device 701.

Cloud management server 702 may employ an authentication framework and/or a protocol such as OpenID of the OpenID Foundation (OIDF) to facilitate federated authentication. More specifically, cloud management server 702 may be compatible with the OpenID Connect (OIDC) flow (e.g., OpenID Connect authorization code flow). For example, identity platform 708 may function as an OpenID relying party (e.g., an OpenID client), under the OIDC flow, and connect to one or more OpenID providers (also known as OpenID servers, identity providers, or OpenID identity providers) such as gateway server 704. Identity platform 708 may connect to other identity providers (e.g., Azure Active Directory by Microsoft Corporation of Redmond, Wash.; Okra by Okta, Inc. of San Francisco, Calif.; Google Identity Platform by Google LLC of Mountain View, Calif.; etc.). In other words, cloud computing environment 700 may be a multiple-tenant environment with multiple clients interacting with multiple gateways and/or multiple active directories. Under the OIDC flow, identity platform 708 itself may function as an OpenID provider to workspace 705, which in this relationship may function as an OpenID relying party to identity platform 708.

When user device 701 connects to workspace 705 to access various resources, cloud management server 702 may require that user device 701 be authenticated first. However, rather than having user device 701 be authenticated by cloud management server 702 itself, cloud management server 702 may use federated authentication for authentication of user device 701. For example, workspace 705 (e.g., a relying party) may send an authentication request to identity platform 708 (e.g., an identity provider) according to the OIDC flow (e.g., OIDC authorization code flow). Additionally or alternatively, identity platform 708 (e.g., a relying party) may send an authentication request to gateway server 704 (e.g., an identity provider) according to the OIDC flow (e.g., OIDC authorization code flow). Gateway server 704 may authenticate user device 701 and/or its user (also referred to as an end-user) by asking the user to provide user credentials (e.g., username and password) to gateway server 704. Gateway server 704 may include, for example, access gateway 560 of FIG. 5; gateway server 606 of FIG. 6; etc. Gateway server 704 may be, for example, Citrix Gateway developed by Citrix Systems, Inc. of Ft. Lauderdale, Fla. Gateway server 704 may use database 709 for authenticating user device 701. Database 709 may be, for example, an active directory (AD). For example, gateway server 704 may determine whether the user credentials provided by the user match preexisting credentials, stored in database 709, that correspond to the user and/or user device 701. If the authentication is successful (e.g., the user credentials provided by the user match the preexisting credentials), then gateway server 704 may send one or more tokens (e.g., an ID token, an access token, and/or a refresh token) to cloud management server 702. Gateway server 704 may insert encrypted user credentials inside one or more tokens (e.g., an access token) before sending them to cloud management server 702 (e.g., identity platform 708). The tokens may be encrypted using per-client information (e.g., client secret) and/or per-user information (e.g., nonce and/or salt). The one or more tokens may be sent as a JavaScript Object Notation (JSON) Web Token (JWT) object and/or a JSON Web Encryption (JWE) object. Gateway server 704 may also send the per-user information (e.g., nonce and/or salt) to cloud management server 702.

Cloud management server 702 (e.g., identity platform 708) may receive the one or more tokens (e.g., an access token) from gateway server 704 and decrypt, using the received per-user information, the data stored within to retrieve the user credentials (e.g., username and/or password). Cloud management server 702 may use the user credentials to log user device 701 into virtual machine 703. For example, identity platform 708 may provide the user credentials to virtual desktop agent 710 running on virtual machine 703. Notably, cloud management server 702 (e.g., identity platform 708) may provide the user credentials directly to virtual machine 703 (e.g., virtual desktop agent 710) via a back channel and not via user device 701. Virtual desktop agent 710 may be a software component that runs on top of the operating system (e.g., Windows developed by Microsoft Corporation of Redmond, Wash.). Virtual desktop agent 710 (e.g., Citrix Virtual Desktop Agent developed by Citrix Systems, Inc. of Ft. Lauderdale, Fla.) may be a component of a virtual desktop service such as Citrix Virtual Apps and Desktops Service (CVADS) developed by Citrix Systems, Inc. of Ft. Lauderdale, Fla. For example, virtual desktop agent 710 may provide the received user credentials to the operating system (e.g., Windows) as the username and password for signing in the user for the operating system.

Figure 8:
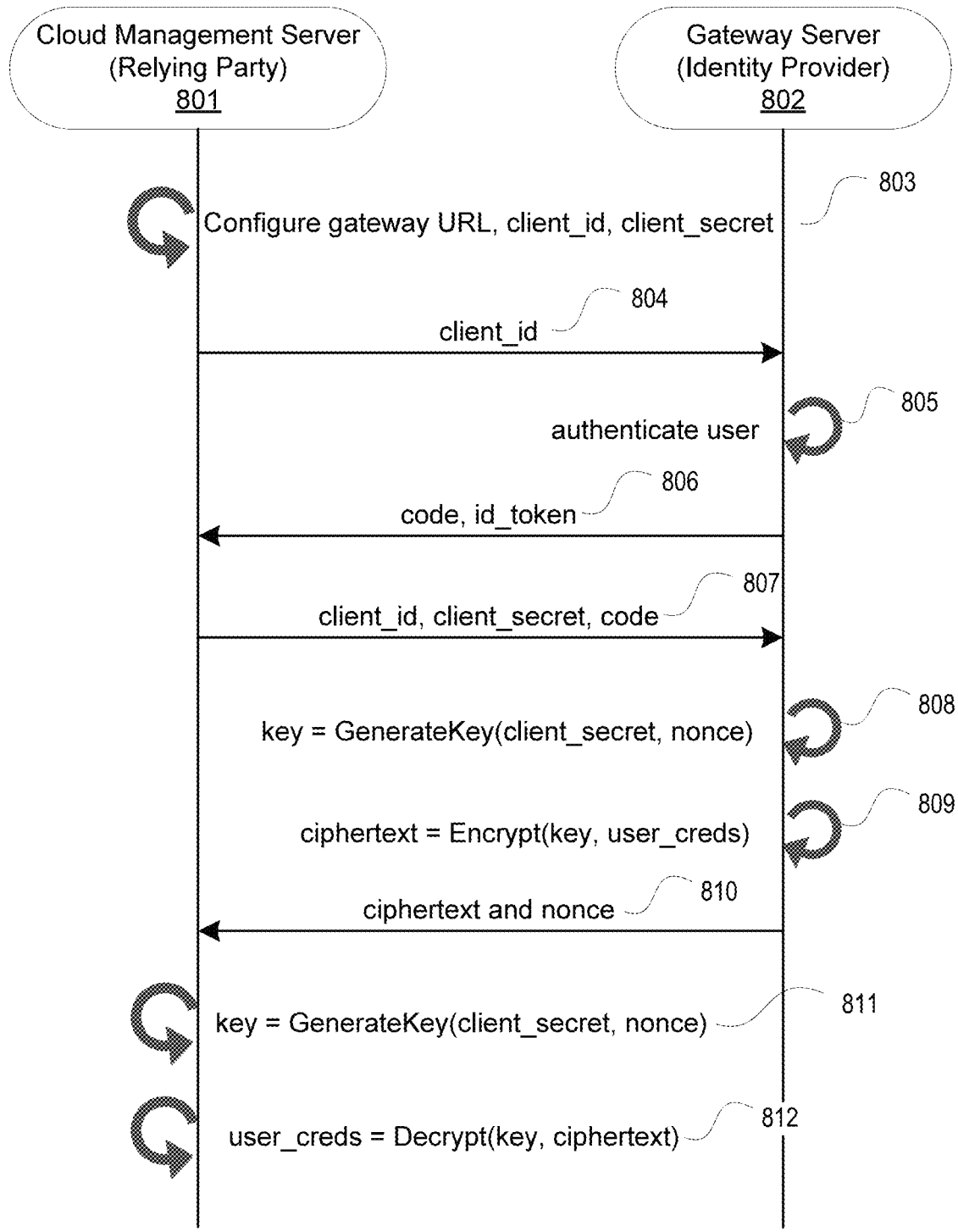
FIG. 8 depicts an example flow diagram for sharing user credentials between a cloud management server and a gateway server.

FIG. 8 depicts an example flow diagram for sharing user credentials between cloud management server 801 and gateway server 802. Cloud management server 801 may be, for example, cloud management server 702 of FIG. 7. Gateway server 802 may be, for example, gateway server 704 of FIG. 7. The interactions between cloud management server 801 and gateway server 802 as depicted in FIG. 8 may be according to the OIDC authorization code flow, although other types of OIDC flows (e.g., authentication flow, implicit flow, hybrid flow, etc.) may be also applicable. Thus, in this relationship, cloud management server 801 may act as a relying party (RP) and gateway server 802 may act as an identity provider according to the OIDC protocol. Cloud management server 801 may also be referred to as a client or a customer. Gateway server 802 may also be referred to as an OpenID provider (OP) or an authorization server. The flow diagram (e.g., algorithm) depicted in FIG. 8 or one or more steps thereof may be embodied in computer-executable instructions that are stored in a computer-readable medium, such as a non-transitory computer readable medium. The steps in this flow diagram need not all be performed in the order specified and some steps may be omitted or changed in order, and other steps not depicted in FIG. 8 may be added.

At step 803, cloud management server 801 may configure one or more uniform resource locators (URLs) of gateway server 802. The URL(s) of gateway server 802 may be associated with an authorization end-point through which authentication of the end-user is performed and/or with a token end-point through which cloud management server 801 may obtain tokens from gateway server 802. The URL may be passed along to cloud management server 801 by gateway server 802. Cloud management server 801 may configure a client identifier or client ID. The client ID ("client_id") according to the OIDC protocol may be a public identifier for the client (e.g., cloud management server 801). The client ID may be, for example, a value of a predetermined length (e.g., a 32-character hex string). The client ID may have been passed along to cloud management server 801 by gateway server 802. Cloud management server 801 may configure a client secret. The client secret ("client_secret") according to the OIDC protocol may be a secret known only to the client (e.g., cloud management server 801) and the authorization server (e.g., gateway server 802). The client secret may be, for example, a value of a predetermined length (e.g., a 256-bit value). The client secret may have been passed along to cloud management server 801 by gateway server 802.

At step 804, cloud management server 801 may send the client ID to gateway server 802 (e.g., an authorization end-point). The client ID may be sent as part of an authentication request (e.g., "AuthN Request") message. The authentication request may be an OAuth 2.0 Authorization Request that requests that the end-user be authenticated by the authorization server (e.g., gateway server 802).

At step 805, gateway server 802 may perform authentication of the end-user (e.g., user device 701 of FIG. 1 and/or its user) if the end-user has not been authenticated already. For example, gateway server 802 may receive user credentials (e.g., username and/or password) from the end-user.

Gateway server 802 may access an active directory (AD) in order to verify whether the received user credentials are valid. Gateway server 802 may also obtain one or more end-user consents and/or authorizations regarding one or more services (e.g., sharing an email address, sharing personal information, etc.).

Upon successful authentication of the end-user, gateway server 802 may send a code and a token at step 806. The code and the token may be included in an authentication response ("AuthN Response") message that is sent in response to the authentication request. The code may be an authorization code according to the OIDC protocol. The token may be an ID token according to the OIDC protocol. The ID token may include various attributes regarding the end-user.

At step 807, cloud management server 801 may send the client ID, the client secret, and the code to gateway server 802. The client ID, the client secret, and the code may be sent as part of a token request message (e.g., a request for an access token) to gateway server 802 (e.g., token endpoint) according to the OIDC protocol. The code may be the authorization code.

At step 808, gateway server 802 may generate a key based on the client secret and a nonce. The nonce may be a random nonce (e.g., salt) generated by gateway server 802. The key may be generated by using a key generation function. For example, gateway server 802 may perform the Password-Based Key Derivation Function 2 (PBKDF2) algorithm over the client secret and the nonce for 10,000 iterations using hash-based message authentication code (HMAC) to generate a 32-byte content-encryption key (CEK).

At step 809, gateway server 802 may generate a cyphertext by encrypting the user credentials received at step 805 based on the key generated at step 808. For example, gateway server 802 may encrypt the user credentials with the CEK using Advanced Encryption Standard Galois/Counter Mode 256 (AES-CGM-256) authenticated encryption. At step 810, gateway server 802 may send the cyphertext generated at step 809 and the nonce (e.g., salt) from step 808 to cloud management server 801. The ciphertext may be formed as part of an access token. For example, the access token (e.g., a JWE token) may have a header that contains the nonce (e.g., salt) and an algorithm hint. Gateway server 802 may send the access token (e.g., a JWE token) to cloud management server 801. The access token may allow cloud management server 801 to make request(s) to gateway server 802 for one or more resources.

At step 811, cloud management server 801 may generate a key based on the client secret and the nonce (e.g., by extracting the nonce from the header of the JWE token received at step 810). Cloud management server 801 may use substantially the same algorithm(s) used by gateway server 802 at step 808 to generate its key (e.g., CEK). Notably, the key generated at step 811 may be identical to the key generated at step 808. At step 812, cloud management server 801 may extract the user credentials by decrypting the ciphertext received at step 810 using the key (e.g., CEK) generated at step 811. Subsequently, cloud management server 801 may store the user credentials and/or use them to perform single sign-on with one or more resources. Cloud management server 801 may store the user credentials in an encrypted form for increased security.

By encrypting the user credentials into an access token being sent by the identity provider (e.g., gateway server 802) to the relying party (e.g., cloud management server 801), the relying party can have access to the user credentials that it would normally not be privy to under the conventional OIDC scheme. Moreover, by encrypting the user credentials based on per-client information such as the client secret and per-user (e.g., per-end-user) information such as the nonce that changes often, the present embodiment is less prone to replay attacks and dictionary attacks. In other words, the encryption of the user credentials is based on a pre-shared key (e.g., client secret) and a dynamically generated value (e.g., nonce).

Figure 9:
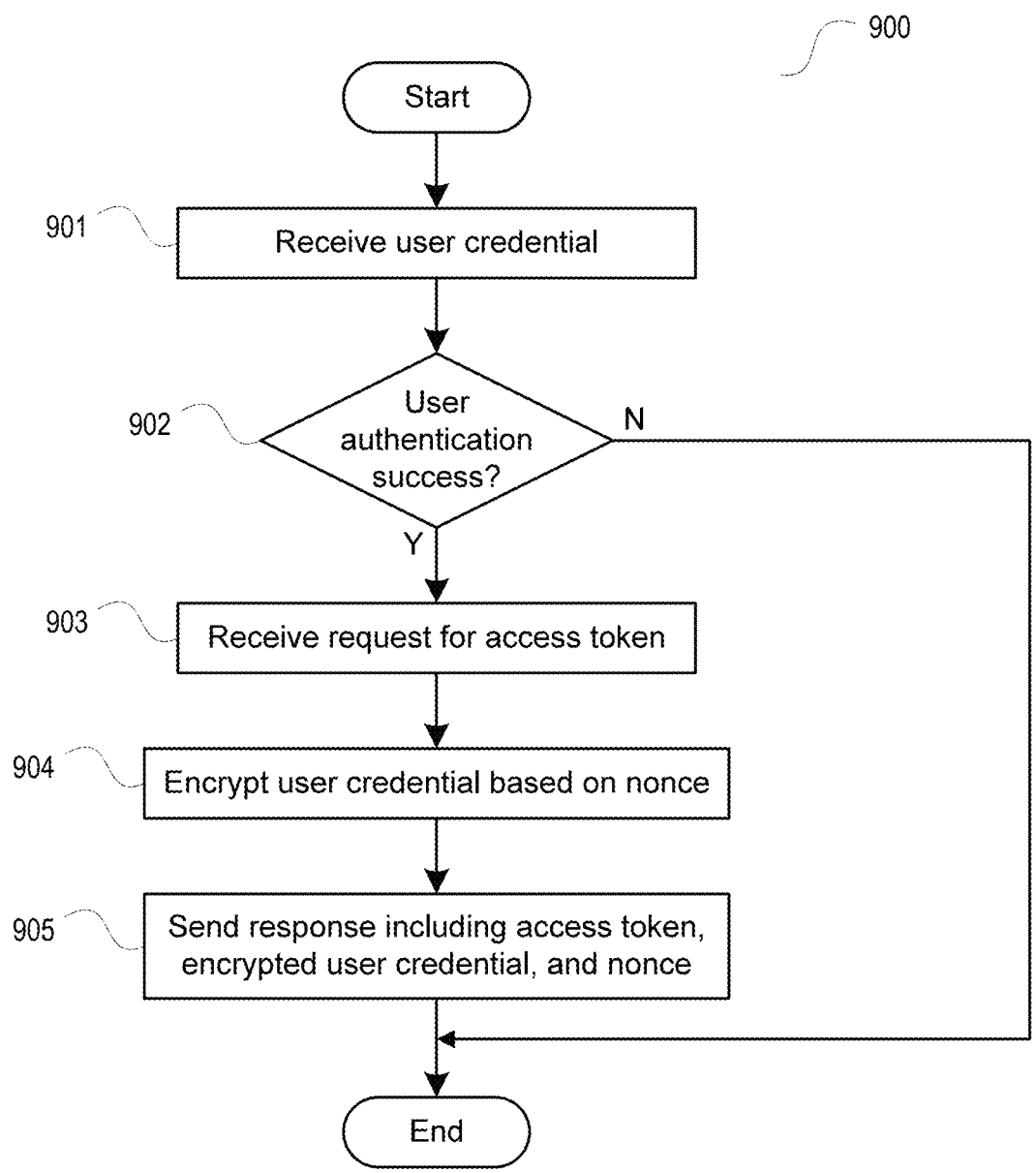
FIG. 9 is a flow chart showing an example method 900 for sharing user credentials between a relying party and an identity provider.

FIG. 9 is a flow chart showing an example method 900 for sharing user credentials between a relying party and an identity provider. Method 900 (e.g., algorithm), or one or more operations of the method, may be performed by one or more computing devices or entities. For example, portions of method 900 may be performed by components of cloud computing environment 700 or gateway server 704. Method 900 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 901, an identity provider may receive a user credential from a user device. The user credential may be a username and/or a password. The identity provider may be a gateway server such as gateway server 704 of FIG. 7. The identity provider may be performing federated authentication of the user device on behalf of a relying party.

At step 902, the identity provider may determine whether user authentication, based on the user credential, is successful. The identity provider may access an active directory to make the determination. For example, the identity provider may determine whether the received user credentials match the stored user credentials in the active directory. If the user authentication is unsuccessful (902: N), the process may end. In such a case, the identity provider may send an error response to the relying party before ending the process. If the user authentication is successful (902: Y), then the process may continue to step 903.

At step 903, the identity provider may receive, from the relying party, a request for an access token. The relying party may be a cloud management server such as cloud management server 702 of FIG. 7. The request may include a token request that is in accordance with an OpenID connect authorization code flow. The request may include a client secret associated with the relying party. Encrypting the user credential may include generating, based on a client secret and the nonce, a key, where the client secret is associated with the relying part, and encrypting the user credential based on the key. Generating the key may include performing a password-based key derivation function, for a predetermined quantity of iterations, on the client secret and the nonce. The client secret may have been generated by the identity provider to be unique to the relying party, and the client secret may have been sent to the relying party.

At step 904, the identity provider may encrypt the user credential based on a nonce that is uniquely generated for the relying party, the user credential. Encrypting the user credential may be further based on a successful authentication, by the identity provider and using the user credential, of a user associated with the user device.

At step 905, the identity provider may send, to the relying party, a response to the request. The response may comprise the access token, the encrypted user credential, and the nonce. The response may include a JavaScript Object Notation Web Token (JWT) message, a JavaScript Object Notation Web Encryption (JWE) message, and/or a JavaScript Object Notation Web Encryption (JWS) message.

The following paragraphs (M1) through (M7) describe examples of methods that may be implemented in accordance with the present disclosure.

(M1) A method comprising: receiving, by an identity provider and from a user device, a user credential; receiving, by the identity provider and from a relying party, a request for an access token; encrypting, based on a nonce that is uniquely generated for the relying party, the user credential; and sending, to the relying party, a response to the request, the response comprising the access token, the encrypted user credential, and the nonce.

(M2) A method may be performed as described in paragraph (M1) wherein the encrypting the user credential is further based on a successful authentication, by the identity provider and using the user credential, of a user associated with the user device.

(M3) A method may be performed as described in any of paragraphs (M1) through (M2), wherein the request comprises a client secret associated with the relying party, and wherein the encrypting the user credential comprises: generating, based on the client secret and the nonce, a key, wherein the client secret is associated with the relying party; and encrypting, based on the key, the user credential.

(M4) A method may be performed as described in paragraph (M3), wherein the generating the key comprises performing a password-based key derivation function, for a predetermined quantity of iterations, on the client secret and the nonce.

(M5) A method may be performed as described in paragraph (M3), further comprising: generating, by the identity provider, the client secret that is unique to the relying party; and sending, to the relying party, the client secret.

(M6) A method may be performed as described in any of paragraphs (M1) through (M5), wherein the request comprises a token request that is in accordance with an OpenID connect authorization code flow.

(M7) A method may be performed as described in any of paragraphs (M1) through (M6), the response comprises at least one of a JavaScript Object Notation Web Token (JWT) message or a JavaScript Object Notation Web Encryption (JWE) message.

The following paragraphs (A1) through (A7) describe examples of apparatuses that may be implemented in accordance with the present disclosure.

(A1) An identity provider comprising: one or more processors; and memory storing instructions that, when executed by the one or more processors, cause the identity provider to: receive, from a relying party, a request for an access token; receive, from a user device, a user credential; encrypt, based on a nonce that is uniquely generated for the relying party, the user credential, the user credential; and send, to the relying party, a response to the request, the response comprising the access token, the encrypted user credential, and the nonce.

(A2) An identity provider as described in paragraph (A1), wherein the instructions, when executed by the one or more processors, cause the identity provider to encrypt the user credential further based on a successful authentication, by the identity provider and using the user credential, of a user associated with the user device.

(A3) An identity provider as described in any of paragraphs (A1) through (A2), wherein the request comprises a client secret associated with the relying party, and wherein the instructions, when executed by the one or more processors, cause the identity provider to encrypt the user credential by: generating, based on the client secret and the nonce, a key, wherein the client secret is associated with the relying party; and encrypting, based on the key, the user credential.

(A4) An identity provider as described in paragraph (A3), wherein the instructions, when executed by the one or more processors, cause the identity provider to generate the key by performing a password-based key derivation function, for a predetermined quantity of iterations, on the client secret and the nonce.

(A5) An identity provider as described in paragraph (A3), wherein the instructions, when executed by the one or more processors, further cause the identity provider to: generate the client secret that is unique to the relying party; and send, to the relying party, the client secret.

(A6) An identity provider as described in any of paragraphs (A1) through (A5), wherein the request comprises a token request that is in accordance with an OpenID connect authorization code flow.

(A7) An identity provider as described in any of paragraphs (A1) through (A6), wherein the response comprises at least one of a JavaScript Object Notation Web Token (JWT) message or a JavaScript Object Notation Web Encryption (JWE) message.

The following paragraphs (CRM1) through (CRM7) describe examples of computer-readable media that may be implemented in accordance with the present disclosure.

(CRM1) A non-transitory computer-readable medium storing instructions, when executed by a computing device, cause the computing device to: receive, from a relying party, a request for an access token; receive, from a user device, a user credential; encrypt, based on a nonce that is uniquely generated for the relying party, the user credential, the user credential; and send, to the relying party, a response to the request, the response comprising the access token, the encrypted user credential, and the nonce.

(CRM2) A non-transitory computer-readable medium as described in paragraph (CRM1), wherein the instructions, when executed by the computing device, cause the computing device to encrypt the user credential further based on a successful authentication, using the user credential, of a user associated with the user device.

(CRM3) A non-transitory computer-readable medium as described in any of paragraphs (CRM1) through (CRM2), wherein the request comprises a client secret associated with the relying party, and wherein the instructions, when executed by the computing device, cause the computing device to encrypt the user credential by: generating, based on the client secret and the nonce, a key, wherein the client secret is associated with the relying party; and encrypting, based on the key, the user credential.

(CRM4) A non-transitory computer-readable medium as described in paragraph (CRM3), wherein the instructions, when executed by the computing device, cause the computing device to generate the key by performing a password-based key derivation function, for a predetermined quantity of iterations, on the client secret and the nonce.

(CRM5) A non-transitory computer-readable medium as described in paragraph (CRM3), wherein the instructions, when executed by the computing device, further cause the computing device to: generate the client secret that is unique to the relying party; and send, to the relying party, the client secret.

(CRM6) A non-transitory computer-readable medium as described in any of paragraphs (CRM1) through (CRM5), wherein the request comprises a token request that is in accordance with an OpenID connect authorization code flow.

(CRM7) A non-transitory computer-readable medium as described in any of paragraphs (CRM1) through (CRM6), wherein the request comprises a token request that is in accordance with an OpenID connect authorization code flow, and wherein the response comprises at least one of a JavaScript Object Notation Web Token (JWT) message or a JavaScript Object Notation Web Encryption (JWE) message.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by an identity provider and from a user device, a user credential;
   receiving, by the identity provider and from a relying party, a request for an access token, the request comprising a client secret associated with the relying party;
   encrypting, based on a nonce that is uniquely generated for the relying party, the user credential; and
   sending, to the relying party, a response to the request, the response comprising the access token, the encrypted user credential, and the nonce;
   wherein the encrypting the user credential comprises:
      generating, based on the client secret and the nonce, a key, wherein the client secret is associated with the relying party, and
      encrypting, based on the key, the user credential; and
   wherein generating the key comprises performing a password-based key derivation function, for a predetermined quantity of iterations, on the client secret and the nonce.

2. The method of claim 1, wherein the encrypting the user credential is further based on a successful authentication, by the identity provider and using the user credential, of a user associated with the user device.

3. The method of claim 1, further comprising:
   generating, by the identity provider, the client secret that is unique to the relying party; and
   sending, to the relying party, the client secret.

4. The method of claim 1, wherein the request comprises a token request that is in accordance with an OpenID connect authorization code flow.

5. The method of claim 1, wherein the response comprises at least one of a JavaScript Object Notation Web Token (JWT) message or a JavaScript Object Notation Web Encryption (JWE) message.

6. An identity provider comprising:
   one or more processors; and
   memory storing instructions that, when executed by the one or more processors, cause the identity provider to:
      receive, from a relying party, a request for an access token, the request comprising a client secret associated with the relying party;
      receive, from a user device, a user credential;
      encrypt, based on a nonce that is uniquely generated for the relying party, the user credential; and
      send, to the relying party, a response to the request, the response comprising the access token, the encrypted user credential, and the nonce;
      wherein the instructions, when executed by the one or more processors, cause the identity provider to encrypt the user credential by:
         generating, based on the client secret and the nonce, a key, wherein the client secret is associated with the relying party; and
         encrypting, based on the key, the user credential; and
      wherein the instructions, when executed by the one or more processors, cause the identity provider to generate the key by performing a password-based key derivation function, for a predetermined quantity of iterations, on the client secret and the nonce.

7. The identity provider of claim 6, wherein the instructions, when executed by the one or more processors, cause the identity provider to encrypt the user credential further based on a successful authentication, by the identity provider and using the user credential, of a user associated with the user device.

8. The identity provider of claim 1, wherein the instructions, when executed by the one or more processors, further cause the identity provider to:
   generate the client secret that is unique to the relying party; and
   send, to the relying party, the client secret.

9. The identity provider of claim 6, wherein the request comprises a token request that is in accordance with an OpenID connect authorization code flow.

10. The identity provider of claim 6, wherein the response comprises at least one of a JavaScript Object Notation Web Token (JWT) message or a JavaScript Object Notation Web Encryption (JWE) message.

11. A non-transitory computer-readable medium storing instructions, when executed by a computing device, cause the computing device to:
   receive, from a relying party, a request for an access token, the request comprising a client secret associated with the relying party;
   receive, from a user device, a user credential;
   encrypt, based on a nonce that is uniquely generated for the relying party, the user credential; and
   send, to the relying party, a response to the request, the response comprising the access token, the encrypted user credential, and the nonce;
   wherein the instructions, when executed by the computing device, cause the computing device to encrypt the user credential by:
      generating, based on the client secret and the nonce, a key, wherein the client secret is associated with the relying party, and
      encrypting, based on the key, the user credential; and
   wherein the instructions, when executed by the computing device, cause the computing device to generate the key by performing a password-based key derivation function, for a predetermined quantity of iterations, on the client secret and the nonce.

12. The non-transitory computer-readable medium of claim 11, wherein the instructions, when executed by the computing device, cause the computing device to encrypt the user credential further based on a successful authentication, using the user credential, of a user associated with the user device.

13. The non-transitory computer-readable medium of claim 11, wherein the request comprises a token request that is in accordance with an OpenID connect authorization code flow.

14. The non-transitory computer-readable medium of claim 11, wherein the request comprises a token request that is in accordance with an OpenID connect authorization code flow, and wherein the response comprises at least one of a JavaScript Object Notation Web Token (JWT) message or a JavaScript Object Notation Web Encryption (JWE) message.

* * * * *